US011032217B2

(12) United States Patent
Liu et al.

(10) Patent No.: US 11,032,217 B2
(45) Date of Patent: Jun. 8, 2021

(54) REUSING ENTITIES IN AUTOMATED TASK-BASED MULTI-ROUND CONVERSATION

(71) Applicant: INTERNATIONAL BUSINESS MACHINES CORPORATION, Armonk, NY (US)

(72) Inventors: Xin Liu, Xi'an (CN); Hai Ji, Beijing (CN); Yuan Lin Yang, Beijing (CN); Zhu Lin Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 16/206,888

(22) Filed: Nov. 30, 2018

(65) Prior Publication Data
US 2020/0177527 A1    Jun. 4, 2020

(51) Int. Cl.
*H04L 12/58* (2006.01)
*G06N 20/00* (2019.01)

(52) U.S. Cl.
CPC ............. *H04L 51/02* (2013.01); *G06N 20/00* (2019.01); *H04L 51/16* (2013.01)

(58) Field of Classification Search
CPC ......... H04L 51/02; H04L 51/16; G06N 20/00; G06N 3/08; G06N 7/005
See application file for complete search history.

(56) References Cited

U.S. PATENT DOCUMENTS

| 9,350,690 B2 * | 5/2016 | Meijer ................... G06Q 10/10 |
| 9,596,196 B1 * | 3/2017 | Hills ....................... H04L 51/16 |
| 10,592,555 B1 * | 3/2020 | Zhang .................. G06Q 30/016 |

(Continued)

FOREIGN PATENT DOCUMENTS

| CN | 104408639 A | 3/2015 |
| CN | 106663129 A | 5/2017 |

(Continued)

OTHER PUBLICATIONS

Jeyapaul, Rajesh K., Importance of Watson conversation dialog flow—how to handle logical conditions, 6 pages. May 31, 2017.
(Continued)

*Primary Examiner* — Javier O Guzman
(74) *Attorney, Agent, or Firm* — Scott Dobson, Esq.; Wayne F. Reinke, Esq.; Heslin Rothenberg Farley & Mesiti P.C.

(57) ABSTRACT

Automated multi-round task-based conversation with a user is disclosed. In a first round conversation between a user and a data processing system involving first task(s), the data processing system cognitively identifies first entity(ies) and one or more first intent(s), based on a first input statement received by the data processing system from the user. In a subsequent second round conversation between the user and the data processing system involving second task(s) different from the first task(s), the data processing system cognitively identifies second entity(ies) and second intent(s), based on a second input statement received by the data processing system from the user. The data processing system reuses at least one of the first entity(ies) in the second round conversation.

17 Claims, 8 Drawing Sheets

(56) References Cited

U.S. PATENT DOCUMENTS

| | | | | |
|---|---|---|---|---|
| 2006/0014552 | A1* | 1/2006 | Cunningham | G06Q 30/0601 455/466 |
| 2010/0082751 | A1* | 4/2010 | Meijer | G06F 15/16 709/206 |
| 2013/0080162 | A1* | 3/2013 | Chang | G10L 15/34 704/235 |
| 2013/0339021 | A1* | 12/2013 | Deshmukh | G10L 15/18 704/257 |
| 2015/0149182 | A1* | 5/2015 | Kalns | G10L 15/18 704/275 |
| 2015/0172236 | A1* | 6/2015 | Meijer | G06Q 10/10 709/206 |
| 2016/0163311 | A1* | 6/2016 | Crook | G10L 15/065 704/275 |
| 2016/0379106 | A1* | 12/2016 | Qi | G06F 16/90332 706/11 |
| 2017/0140755 | A1* | 5/2017 | Andreas | G10L 15/063 |
| 2017/0180276 | A1* | 6/2017 | Gershony | H04L 51/20 |
| 2017/0308791 | A1 | 10/2017 | Jiao et al. | |
| 2018/0004729 | A1 | 1/2018 | Qiu et al. | |
| 2018/0174020 | A1* | 6/2018 | Wu | G06N 3/08 |
| 2018/0357096 | A1* | 12/2018 | McConnell | G06F 9/4843 |
| 2018/0357309 | A1* | 12/2018 | Eidem | H04L 67/20 |
| 2018/0373696 | A1* | 12/2018 | Terry | G06F 16/35 |
| 2019/0043106 | A1* | 2/2019 | Talmor | G06N 3/006 |
| 2019/0104093 | A1* | 4/2019 | Lim | G06F 11/0766 |
| 2019/0188585 | A1* | 6/2019 | Li | G06N 5/043 |
| 2020/0027456 | A1* | 1/2020 | Kim | G06N 5/025 |
| 2020/0042597 | A1* | 2/2020 | Wu | G06F 40/58 |
| 2020/0202194 | A1* | 6/2020 | Wu | G06N 3/004 |

FOREIGN PATENT DOCUMENTS

| | | |
|---|---|---|
| CN | 106683672 A | 5/2017 |
| CN | 107193978 A | 9/2017 |

OTHER PUBLICATIONS

Build an IT support chatbot by using IBM Watson Assistant, 4 pages 2018.

* cited by examiner

REUSING ENTITIES IN AUTOMATED TASK-BASED MULTI-ROUND CONVERSATION

BACKGROUND

Task-based dialogue can be used to complete a specific task by guiding users to provide necessary information through multi-rounds, widely used in smart customer service. But there is a challenge that, if the dialogue switches from one task to another task, prior solutions ask for entities, even if just used with the first task. However, such systems are not as efficient as they could be, due to asking a user for the same information multiple times.

SUMMARY

Shortcomings of the prior art are overcome and additional advantages are provided through the provision, in one aspect, of a computer-implemented method of automated multi-round task-based conversation with a user. The method includes: in a first round conversation between a user and a data processing system involving at least one first task, cognitively identifying, by the data processing system, one or more first entity and one or more first intent, based on a first input statement received by the data processing system from the user; in a second round conversation between the user and the data processing system involving at least one second task different from the first task, the second round conversation being subsequent to the first round conversation, cognitively identifying, by the data processing system, one or more second entity and one or more second intent, based on a second input statement received by the data processing system from the user; and reusing, by the data processing system, at least one of the one or more first entity in the second round conversation.

In another aspect, a system for automated multi-round task-based conversation with a user is provided. The system may include, for example, memory(ies), at least one processor in communication with the memory(ies). The memory(ies) include program instructions executable by the one or more processor to perform a method. The method may include, for example: in a first round conversation between a user and a data processing system involving at least one first task, cognitively identifying, by the data processing system, one or more first entity and one or more first intent, based on a first input statement received by the data processing system from the user; in a second round conversation between the user and the data processing system involving at least one second task different from the first task, the second round conversation being subsequent to the first round conversation, cognitively identifying, by the data processing system, one or more second entity and one or more second intent, based on a second input statement received by the data processing system from the user; and reusing, by the data processing system, at least one of the one or more first entity in the second round conversation.

In a further aspect, a computer program product may be provided. The computer program product may include a storage medium readable by a processor and storing instructions executable by the processor for automated multi-round task-based conversation with a user. The method may include, for example: in a first round conversation between a user and a data processing system involving at least one first task, cognitively identifying, by the data processing system, one or more first entity and one or more first intent, based on a first input statement received by the data processing system from the user; in a second round conversation between the user and the data processing system involving at least one second task different from the first task, the second round conversation being subsequent to the first round conversation, cognitively identifying, by the data processing system, one or more second entity and one or more second intent, based on a second input statement received by the data processing system from the user; and reusing, by the data processing system, at least one of the one or more first entity in the second round conversation.

Services relating to one or more aspects of this disclosure are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects of this disclosure relate, in general, to automated conversation with a user. More particularly, one or more aspects of this disclosure relate to automatic reuse of entities in an automated multi-round task-based conversation with a user.

As used herein, the term "entity" refers to a predefined category of information needed to perform a task. For example, if the task is to book tickets for air travel, the predefined categories may include, for example, name, identification number (e.g., social security number), travel dates, departure location, destination location and payment information. Relatedly, a "valuable entity," as used herein, is one determined to be reusable in a second task-based conversation.

As used herein, the term "entity" refers to a predefined category of information needed to perform a task. For example, if the task is to book tickets for air travel, the predefined categories may include, for example, name, identification number (e.g., social security number), travel dates, departure location, destination location and payment information. Relatedly, a "valuable entity," as used herein, is one determined to be usable in a second task-based conversation.

As used herein, the term "intent" refers to an intent of a user cognitively derived from one or more statement of the user.

Figure 1:
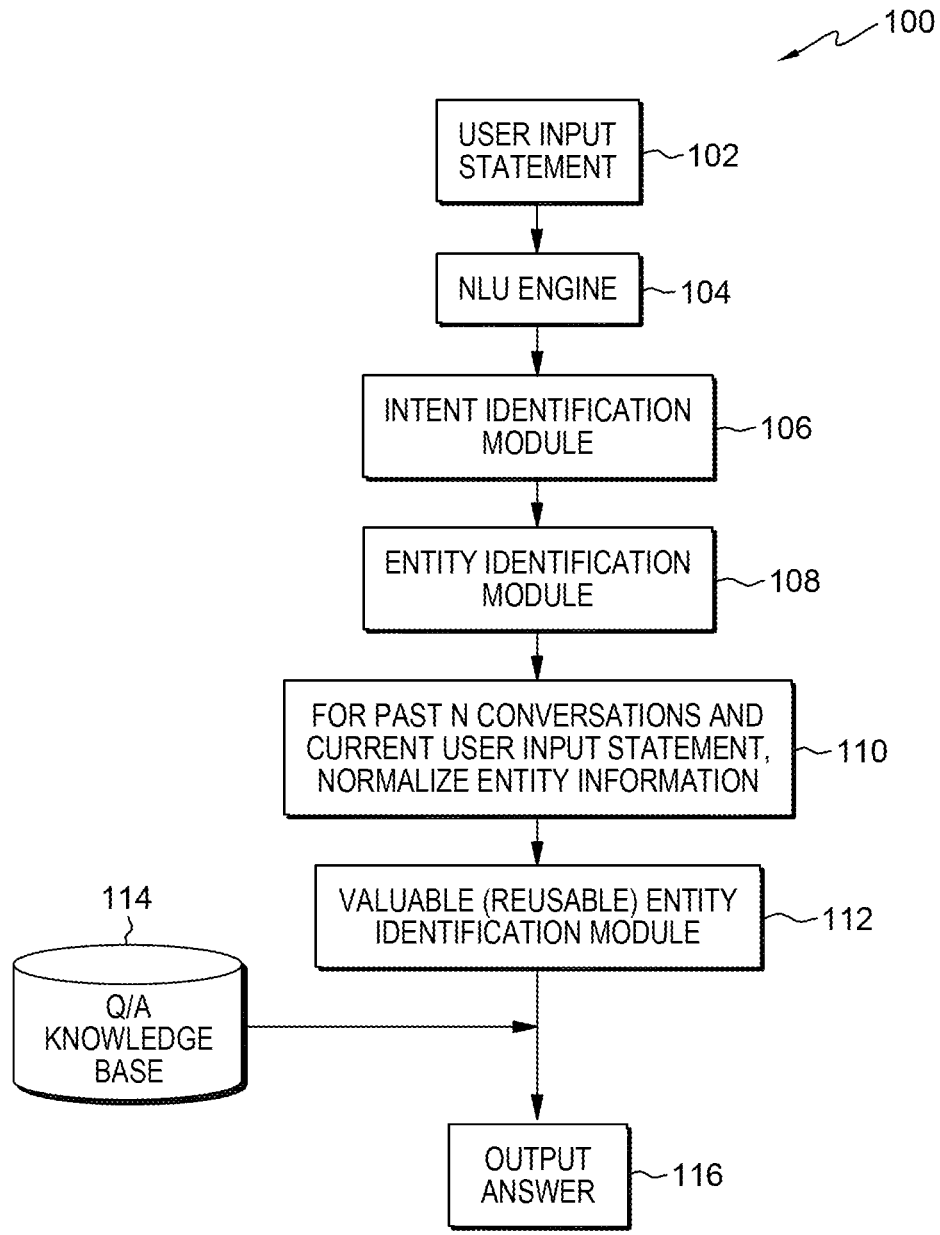
FIG. 1 is a modified block diagram of one example of a system for automated multi-round task-based conversation with a user, in accordance with one or more aspects of the present disclosure.

FIG. 1 is a modified block diagram 100 of one example of a system for automated multi-round task-based conversation with a user, in accordance with one or more aspects of the present disclosure. A user input statement 102 serves as input to Natural Language Understanding (NLU) engine 104. The output of the NLU engine is used by the intent identification module 106 to identify the intent of the user input statement, as processed by the NLU engine. The identified intent is used by the entity identification module 108 to identify a corresponding entity, which is predetermined according to intent. From the past N conversations, which are stored, for example, in a database (not shown), and the current user input statement, the entity information is normalized 110, such that the valuable (i.e., reusable) entity identification module 112 can identify a valuable entity to be used in a subsequent round of conversation. The system may also query a question/answer knowledge base 114 prior to outputting 116 the answer to the user input statement (or "user question").

Figure 2:
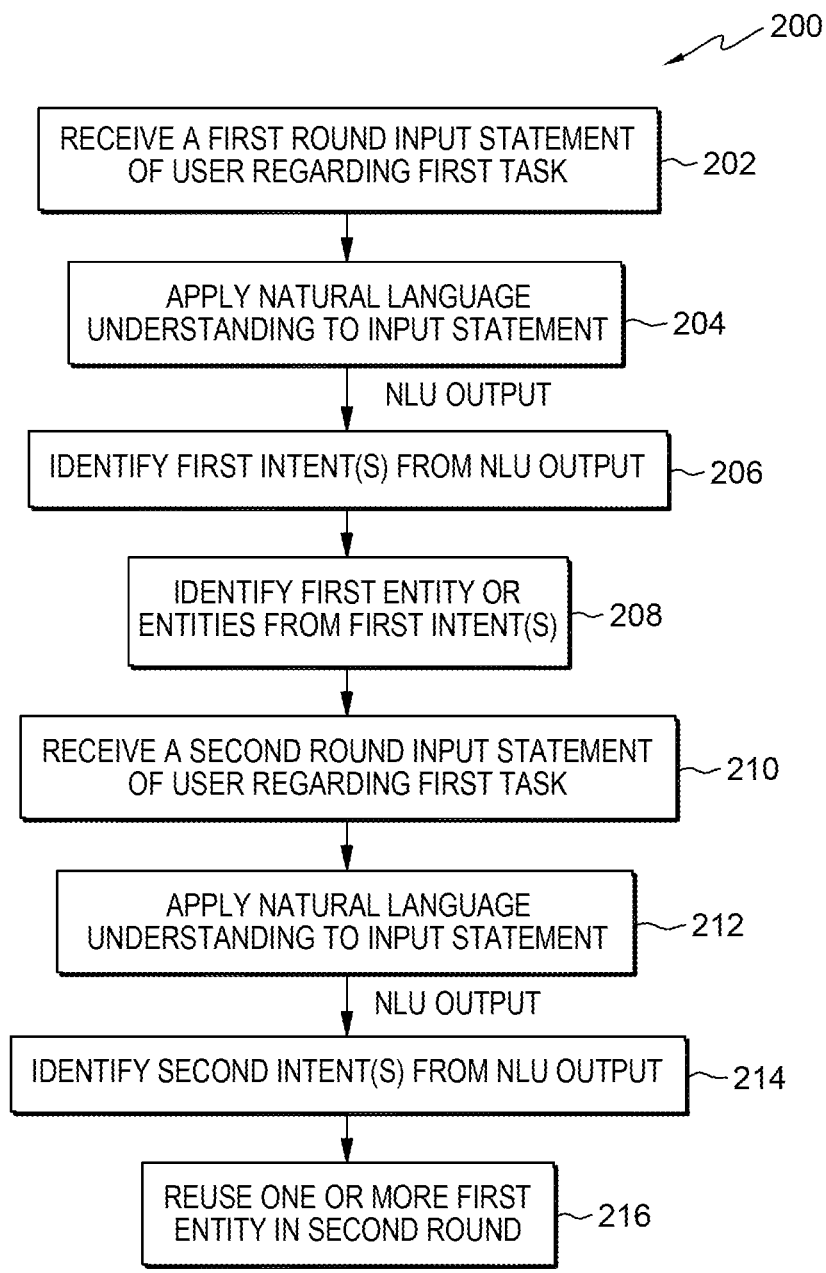
FIG. 2 is a flow diagram for one example of a computer-implemented method of automated multi-round conversation in a task-based conversational system, in accordance with one or more aspects of the present disclosure.

FIG. 2 is a flow diagram 200 for one example of a computer-implemented method of automated multi-round conversation in a task-based conversational system, the conversation being between a user and a data processing system, in accordance with one or more aspects of the present disclosure. In a first round conversation of the multi-round conversation, the system receives 202 an input statement from the user regarding a first task. Natural Language Understanding (NLU) is then applied 204 to the user input statement, resulting in NLU output. From the NLU output, the system identifies 206 one or more first intent. Corresponding first entity(ies) are then identified 208 from the first intent(s). In a second round conversation of the multi-round conversation, the system receives 210 an input statement from the user regarding a second task. Natural Language Understanding (NLU) is then applied 212 to the user input statement, resulting in NLU output. From the NLU output, the system identifies 206 one or more second intent. Corresponding second entity(ies) are then identified 214 from the second intent(s). As part of the second round conversation, one or more first entity is reused 216, thus, reducing the information needed from the user and improving performance as compared to not reusing any of the first round entities (less processor resources, less time).

Figure 3:
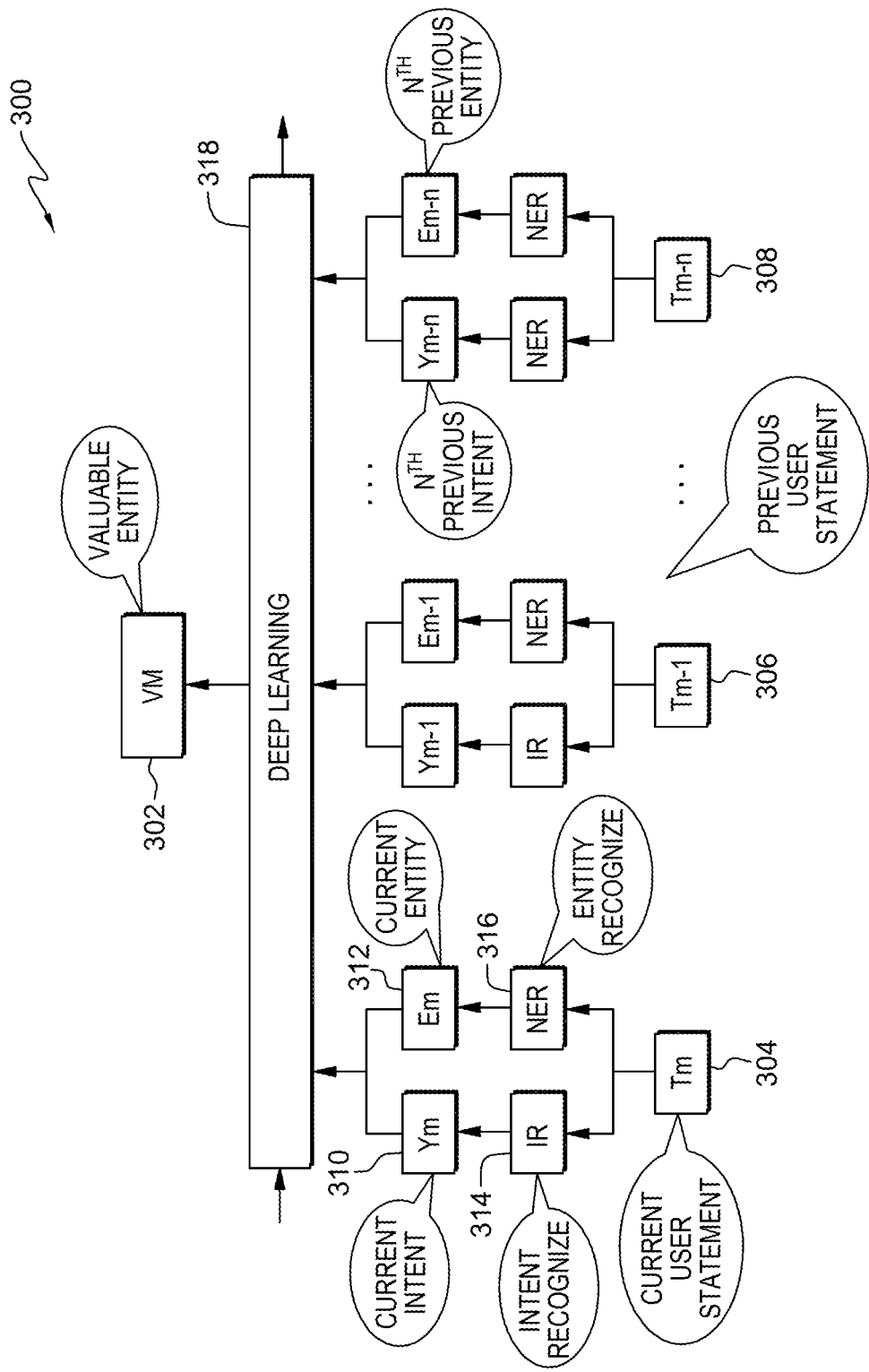
FIG. 3 is combination block/flow diagram for one example of a deep learning entity extraction model to identify a valuable entity, in accordance with one or more aspects of the present disclosure.

FIG. 3 is combination block/flow diagram 300 for one example of a deep learning entity extraction model to identify a valuable entity 302 from the last N user input statement, for example, a current user input statement 304, an immediately prior user input statement 306 and a Nth previous user input statement 308. An intent and associated entity, for example, current intent 310 and current entity 312, are recognized and identified 314 and 316, respectively. The current 304, immediately prior 306 and N prior 308 user input statements are then used for deep learning 324 and one or more valuable entity 302 is identified.

Figure 8:
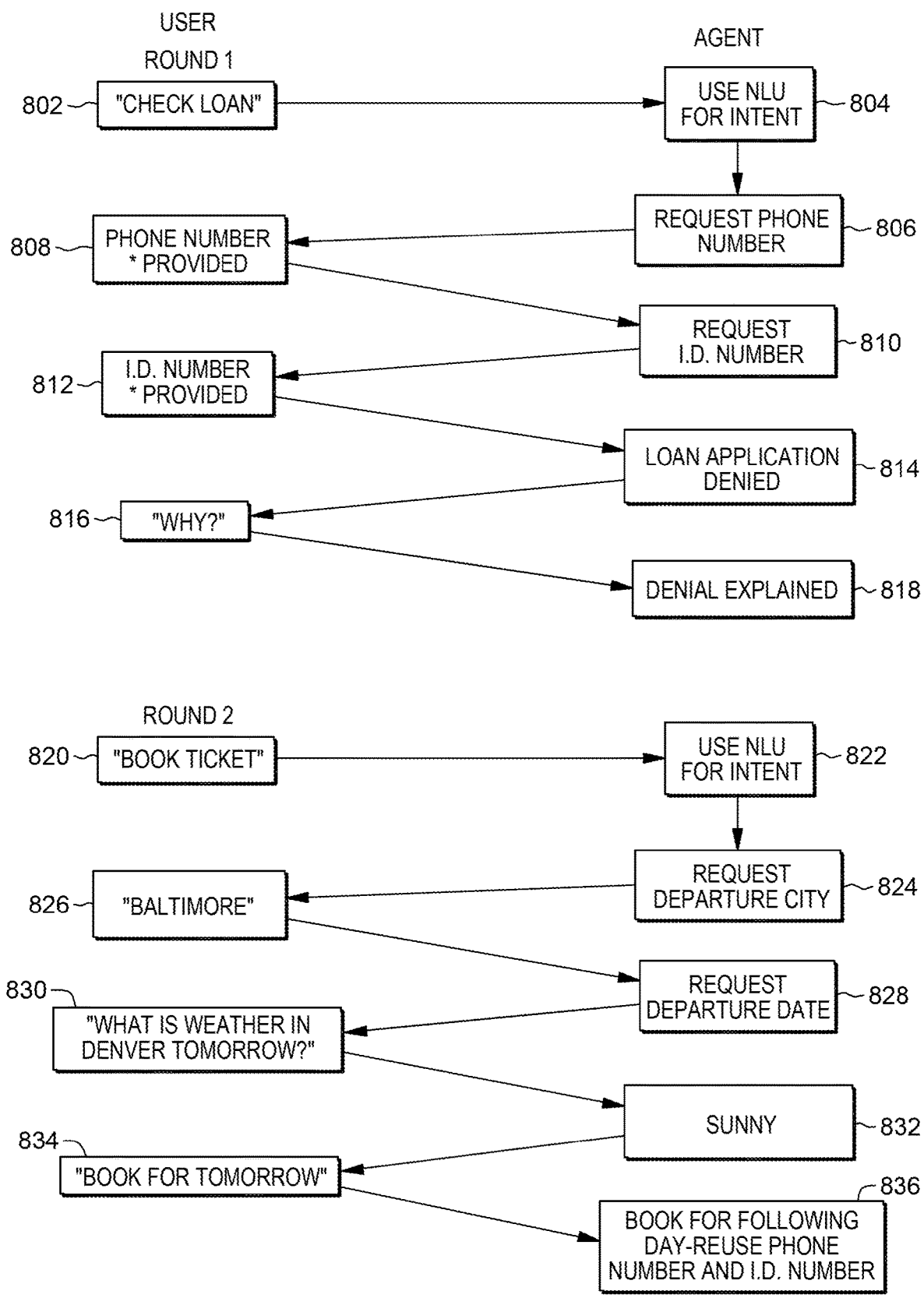
FIG. 8 is a flow diagram for one example of training a deep learning model for entities and intents, in accordance with one or more aspects of the present disclosure.

In one example, described with respect to FIG. 8, a user states "check loan" 802 to the automated agent (the "voice" of the system). The system discerns 804 an intent of the user statement to be, for example, using Natural Language Understanding (NLU) tools, a desire to check on the status of a loan. The agent requests 806 the user's phone number and the user provides it 808. The agent then asks 810 for the user's identification number (e.g., social security number or driver's license number) and the user provides it 812. The agent then indicates 814 to the user that the loan application has been denied. The user asks why 816 and the agent explains 818. In a following conversation with the same user, the user states "booking ticket" 820 to the automated agent. The system discerns 822 an intent of the user statement to be, for example, using Natural Language Understanding tools, a desire to book an airline ticket. The agent requests 824 a departure city from the user and the user replies 826 "Baltimore." The agent then requests 828 a departure date. However, instead of answering the request, the user asks 830 "how is the weather in Denver tomorrow?" The agent answers 832 "sunny." The user then states 834 "book for tomorrow" and the system understands that this is the user's answer to the request for a departure date. The system reuses both the user phone number and identification number and completes the booking 836.

In another example, the user states "book a ticket for tomorrow from Baltimore to Denver." This is discerned by the system (e.g., using NLU tools) to have the intent of booking an airline ticket for the following day from Baltimore, Md., to Denver, Colo. The agent then requests the user's identification number and the user responds with the identification number. The agent replies "okay, I will help you order a ticket." After completion of booking a ticket for the user, the user states "another ticket." The agent responds asking for identification number (in case the ticket is for someone other than the user). In booking the second ticket for the user, the system reuses the date and location provided for the first ticket.

In a similar scenario, after the agent completes ordering the first ticket, the user states "book a return ticket." In response, the agent asks for a departure date, however, the identification number and location are reused.

In this disclosure, a deep learning model is disclosed to automatically extract entities from previous tasks and determine whether to ask for information to overwrite them based on current task. The training corpus of this model is a lot of dialogues that contain multiple tasks which may share the same entities.

Assume there is a conversation between user and agent. We recognize intents and entities from the user's message in each round of conversation. In order to know whether entities need to be reused or asked again, we recognize kept entities from agent's message of each round conversation.

Figure 7:
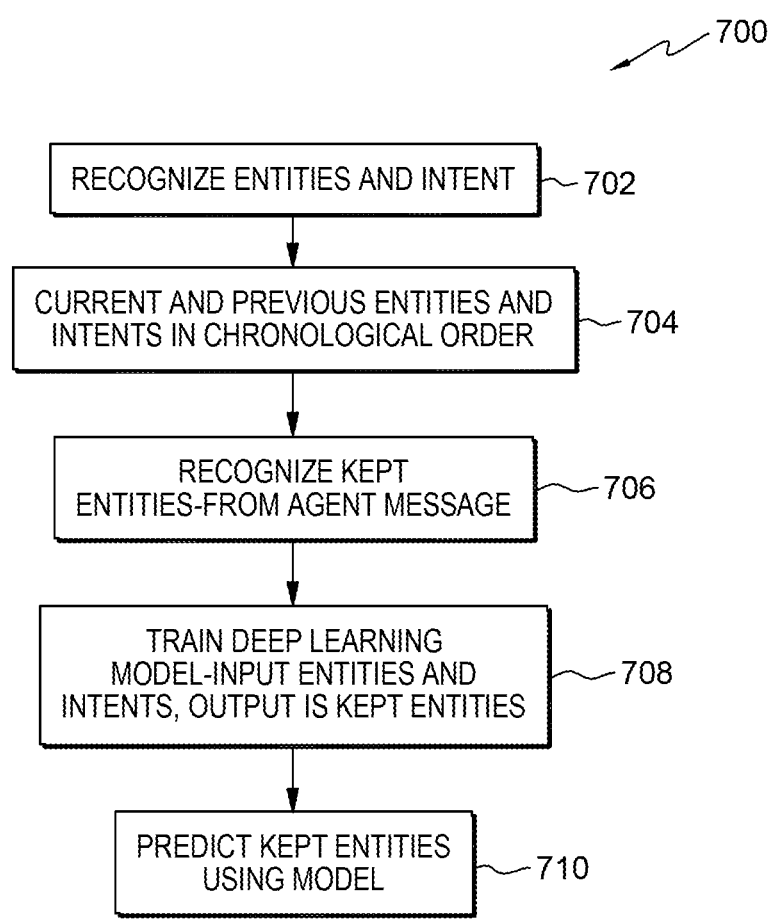
FIG. 7 is a flow diagram for one example of a multi-round task-based conversation with a user, in accordance with one or more aspects of the present disclosure.

The training corpus of deep learning model is pair of input and output. The input of training corpus is the intent and entities that the user supplied during multiple rounds of conversation, the output of training corpus is entities that agent kept in the current round conversation. In accordance with the flow diagram of FIG. 7 discloses that the deep learning model includes the following steps:

1. Recognize entities $E_i$ 702 (where i stands for around number of conversation, i=1, 2, ..., N) and intent $I_i$ (where i stands for a round conversation, i=1, 2, ..., N) from user's statement in each round of conversation.

2. Put 704 entities and intent of a current round conversation and previous M rounds of conversation together in chronological order: $(I_{i-m}, E_{i-m}), \ldots, (I_{i-1}, E_{i-1}), (I_i, E_i)$ where i stands for a round of conversation, i=1, 2, ..., N).

3. Recognize kept entities $Y_i$ 706 (where i stands for a round number of conversation(s), i=1, 2, ..., N) from the agent's message in the current round of conversation.

4. Train 708 the deep learning model with data generated in the steps. Input is intent and entity $(I_{i-m}, E_{i-m}) \ldots (I_{i-1}, E_{i-1})$, $(I_i, E_i)$, and corresponding output is kept entity $Y_i$ (where i stands for around number of conversation, i=1, 2, ..., N).

After deep learning model training, the model can be used to predict 710 kept entities for current conversation scenarios. To use the model, firstly we can recognize intents and entities $(I_{i-m}, E_{i-m}) \ldots (I_{i-1}, E_{i-1}), (I_i, E_i)$ by using steps 1 and 2 above, where i stands for round number of the current conversation. Then input the recognized intents and entities into the model, and the model will predict current kept entities $Y_i$.

In a first aspect, disclosed above is a computer-implemented method of automated multi-round task-based conversation with a user. The computer-implemented method includes: in a first round conversation between a user and a data processing system involving first task(s), cognitively identifying, by the data processing system, first entity(ies) and first intent(s), based on a first input statement received by the data processing system from the user; in a second round conversation between the user and the data processing system involving second task(s) different from the first task(s), the second round conversation being subsequent to the first round conversation, cognitively identifying, by the data processing system, second entity(ies) and second intent(s), based on a second input statement received by the data processing system from the user; and reusing, by the data processing system, at least one of the first entity(ies) in the second round conversation.

In one example, the first entity(ies) and the second entity(ies) are part of predetermined categories.

In one example, the reusing in the computer-implemented method of the first aspect may include, for example, predicting, by the data processing system, the at least one of the first entity(ies) that is reused in the second round conversation. In one example, the computer-implemented method may include, for example, training the data processing system using machine learning to improve the predicting. In one example, the training may include, for example, using a model having as inputs pairs of intent and entity and an output of the at least one of the first entity(ies) that is reused.

In one example, the computer-implemented method of the first aspect may further include, for example, overwriting, by the data processing system, any of the first entity(ies) other than the at least one of the first entity(ies) that is reused in the second round conversation. In one example, the computer-implemented method may further include, for example, requesting, by the data processing system, information from the user for performing the overwriting.

In one example, the computer-implemented method of the first aspect may further include, for example, prior to the first round conversation, training the data processing system to identify: the first entity(ies) and the second entity(ies); and the first intent(s) and the second intent(s).

In one example, the computer-implemented method of the first aspect may further include for example, between the first round conversation and the second round conversation: receiving, by the data processing system, a user input statement unrelated to the first task(s) and the at least one second task; responding to the user input statement unrelated to the first task(s) and the second task(s); and storing the first entity(ies).

In one example, Natural Language Understanding may be used in the method of the first aspect, for example, to interpret the first input statement and the second input statement.

In a second aspect, disclosed above is a system for automated multi-round task-based conversation with a user, the system including: a memory; and processor(s) in communication with the memory, the memory storing program code executable by the at least one processor to perform a method, the method including: in a first round conversation between a user and a data processing system involving first task(s), cognitively identifying, by the data processing system, first entity(ies) and first intent(s), based on a first input statement received by the data processing system from the user; in a second round conversation between the user and the data processing system involving second task(s) different from the first task(s), the second round conversation being subsequent to the first round conversation, cognitively identifying, by the data processing system, second entity(ies) and second intent(s), based on a second input statement received by the data processing system from the user; and reusing, by the data processing system, at least one of the first entity(ies) in the second round conversation.

In one example, the reusing may include, for example, predicting, by the data processing system, the at least one of the first entity(ies) that is reused in the second round conversation.

In one example, the system of the second aspect may further include, for example, prior to the first round conversation, training the data processing system to identify: the first entity(ies) and the second entity(ies); and the first intent(s) and the second intent(s).

In one example, the system of the second aspect may further include, for example, between the first round conversation and the second round conversation: receiving, by the data processing system, a user input statement unrelated to the first task(s) and the second task(s); responding to the user input statement unrelated to the first task(s) and the second task(s); and storing the first entity(ies).

In one example, the Natural Language Understanding may be used in the method of the system of the second aspect, for example, to interpret the first input statement and the second input statement.

In a third aspect, disclosed above is a computer program product, the computer program product including: a storage medium readable by a processor and storing instructions executable by the processor for performing a method of automated multi-round task-based conversation with a user, the method including: in a first round conversation between a user and a data processing system involving first task(s), cognitively identifying, by the data processing system, first entity(ies) and first intent(s), based on a first input statement received by the data processing system from the user; in a second round conversation between the user and the data processing system involving second task(s) different from the first task(s), the second round conversation being subsequent to the first round conversation, cognitively identifying, by the data processing system, second entity(ies) and second intent(s), based on a second input statement received by the data processing system from the user; and reusing, by the data processing system, at least one of the first entity(ies) in the second round conversation.

In one example, the reusing may include, for example, predicting, by the data processing system, the at least one of the first entity(ies) that is reused in the second round conversation.

In one example, the computer program product of the third aspect may further include, for example, prior to the first round conversation, training the data processing system to identify: the first entity(ies) and the second entity(ies); and the first intent(s) and the second intent(s).

In one example, the computer program product of the third aspect may further include, for example, between the first round conversation and the second round conversation: receiving, by the data processing system, a user input statement unrelated to the first task(s) and the second task(s); responding to the user input statement unrelated to the first task(s) and the second task(s); and storing the first entity(ies).

In one example, the Natural Language Understanding may be used in the method of the computer program product of the third aspect, for example, to interpret the first input statement and the second input statement.

Certain embodiments herein may offer various technical computing advantages involving computing advantages to address problems arising in the realm of computer networks. Particularly, computer networks operating to provide automated multi-round task-based conversation with a user. In particular, utilizing a deep learning model for cognitively identifying one or more entity and corresponding intent(s) from a user input statement, which may be verbal or text-based. Where the user input statement is verbal, transcription may be used. Embodiments herein can predict one or more entity from a first task-based conversation that can be reused in a subsequent task-based conversation. Various decision data structures can be used to drive artificial intelligence (AI) decision making, such as decision data structure that cognitively identifies entities and intents. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

User input statements may need interpretation. In such a case, Natural Language Understanding (formerly Natural Language Processing) may be used. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, an API (Application Programming Interface) to a service, one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining a Natural Language Classifier service with a Conversation service if one wants their application to engage in a conversation with a user; and classifying frequently asked questions (FAQs).

In one example, a cognitive computer system performs the analysis. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Figure 4:
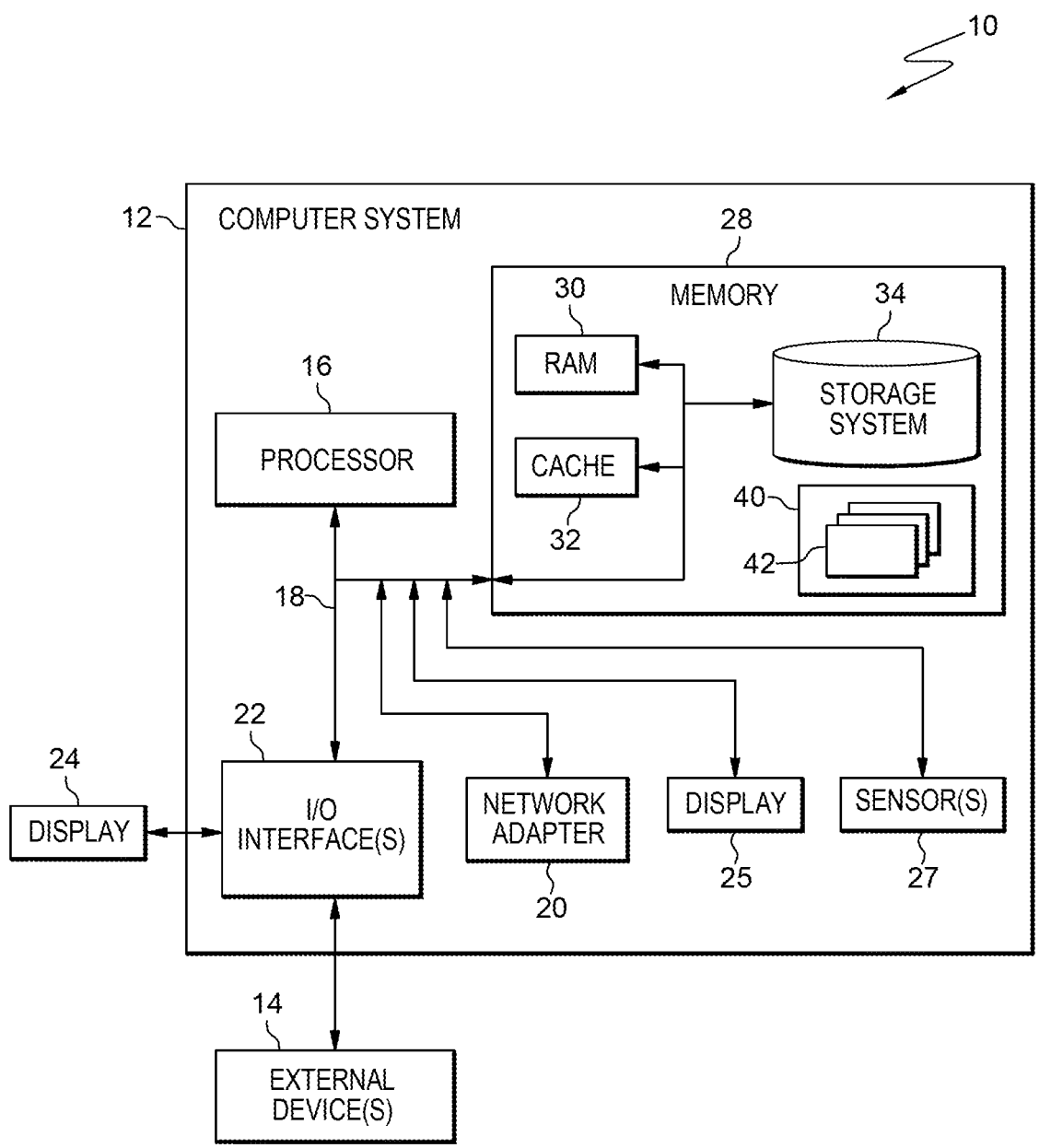
FIG. 4 is a block diagram of one example of a computer system, in accordance with one or more aspects of the present disclosure.

FIG. 4 is a hybrid flow diagram 400 of one example of an overview of the basic steps for creating and using a natural language classifier service. Initially, training data for machine learning is prepared, 402, by identifying class tables, collecting representative texts and matching the classes to the representative texts. An API (Application Planning Interface) may then be used to create and train the classifier 404 by, for example, using the API to upload training data. Training may begin at this point. After training, queries can be made to the trained natural language classifier, 406. For example, the API may be used to send text to the classifier. The classifier service then returns the matching class, along with other possible matches. The results may then be evaluated and the training data updated, 408, for example, by updating the training data based on the classification results. Another classifier can then be trained using the updated training data.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

In addition, cognitive identification of entities and intents may include searching cross co-occurrence matrices in making the cognitive identifications. Reuse of entities between tasks is predicted in real-time. The prediction may be made employing a predictive model trained using machine learning. The cognitive identifications may be continually or periodically updated. The entity reuse, predicting and the cognitive identifications are performed by a processor, in communication with a memory storing instructions for the processor to carry out the predicting and cognitive identifications.

As used herein, the term "cognitive identifications" refers to the use of cognitive computing in identifying entities and intents in real-time. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

As real-time user statements are gathered, intent identification may be continually or periodically updated and used by the system. Periodically, the real-time entity and intent identifications may then be used to retrain the system and create a new cross co-occurrence (CCO) model and matrices to drive the identifications using existing software such as, for example, APACHE MAHOUT™ from The APACHE® Software Foundation (Wakefield, Mass.).

In one example, a simple co-occurrence algorithm may be described using an equation:

$$r=[A^tA]h_a$$

where "r" is a task outcome; "ha" is a user's history of initial inquiries of the user; "A" is a history of all users' initial inquiries and, in one example, matrix "AtA" compares column to column using, for example, a log-likelihood based correlation test. In addition, all information known about a user can be used to find correlations between different statements, known as a cross-occurrence, information such as, for example, follow-up statement the user regarding another task, location-preference, etc. For example, the basic equation can be expanded for different requests:

$$r=[A^tA]h_a+[A^tB]h_b+[A^tC]h_c$$

where ha-hc are user histories of different primary user requests.

In one embodiment, a system to facilitate the computer-implemented method herein can include at a high level, for example, a front end, a back end, a backbone and a search engine. A "front end" in this context refers to an intake module for user behavior and related data. In one example, the front end can be APACHE MAHOUT™ by The APACHE® Software Foundation (Wakefield, Mass.), which is a distributed linear algebra framework and mathematically expressive domain specific language. It serves as a scalable machine-learning library. A "back end" in this context refers to a cluster-computing framework; it is a general purpose "big data" processing engine. Some common uses of such a back end include, for example, interactive queries across large data sets and machine learning. A "backbone" in this context refers to software for use with big data analytics. In one example, HADOOP™ by The APACHE® Software Foundation can serve as the backbone. A "search engine" in this context refers to a large-scale enterprise search platform, for example, SOLR™ by The APACHE® Software Foundation. In one example, a current user statement is input into one or more cross co-occurrence matrices and used to do a search (i.e., a cross co-occurrence query) for similar statements by other users. The results of the search are then used to formulate a response to the user from the system.

The system can run various processes including, for example, a Natural Language Understanding (NLU) process, a predicting process and a machine learning process, to name a few.

A data repository can be used to store various data, for example, data regarding predicting reusable entities, or decision data structures for use in providing artificial intelligence (AI) decisions, for example, cognitively identifying of entities and intents.

The predicting process may employ, for example, a predictive model trained using machine learning to predict reusable entities.

In one example, the system runs a machine learning process that can update one or more process run by the system based on obtained data to improve and accuracy and/or reliability of the one or more process. In one embodiment, the system may, for example, use a decision data structure that predicts, in accordance with the predicting process, entities that can be used in a subsequent conversation.

The system in one embodiment can run a plurality of instances of such a decision data structure, each instance for a different user conversation. For each instance of the decision data structure, the system can vary the entity/intent data. The system running the machine learning process can continually or periodically update the entity/intent data of the different instances of the decision data structure.

The system can run an NLU process to process user input statements for storage of same in a data repository and for other purposes. The system can run a Natural Language Understanding (NLU) process for determining one or more NLU output parameter of user input statements. The process can include one or more categories and output one or more category NLU output parameter and/or a sentiment analysis process which determines sentiment parameter for a message, e.g., polar sentiment NLU output parameters, "negative," "positive," and/or non-polar NLU output sentiment parameters, e.g., "anger," "disgust," "fear," "joy," and/or "sadness" or other classification process for output of one or more other NLU output parameters e.g., one of more "speaking style" NLU output parameter.

By running the NLU process, the system can perform a number of processes including one or more of: (a) topic classification and output of one or more topic NLP output parameter for a received user input statement (or transcription thereof); (b) sentiment classification and output of one or more sentiment NLU output parameter for received user input statements; or (c) other NLU classifications and output of one or more other NLP output parameter for the received message.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a user with respect to some topic or the overall contextual polarity of a user input statement. The attitude may be the user's judgment or evaluation, affective state (the emotional state of the user when giving the input statement), or the intended emotional communication (emotional effect the user wishes to evoke).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Figure 5:
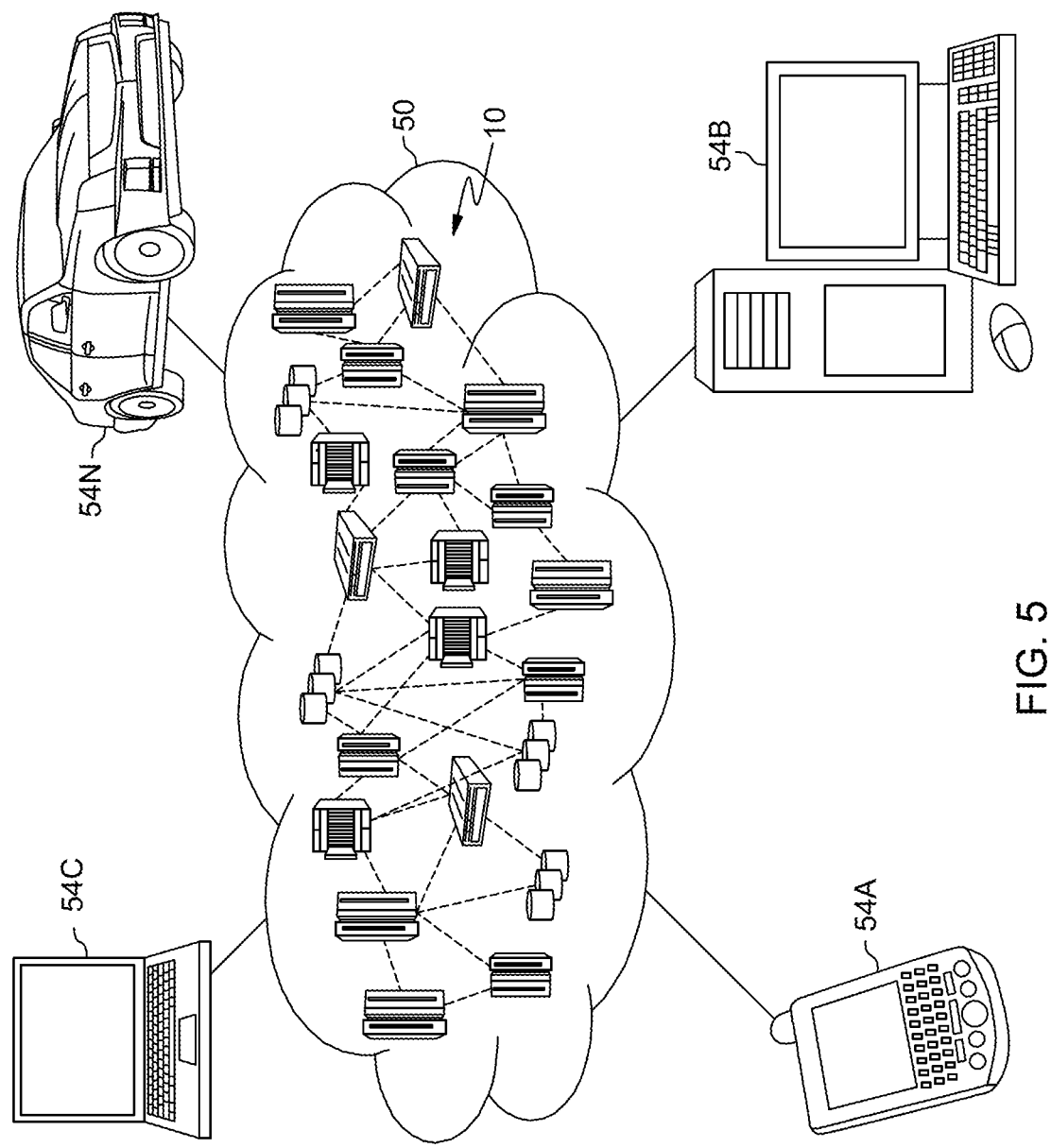
FIG. 5 is a block diagram of one example of a cloud computing environment, in accordance with one or more aspects of the present disclosure.
Figure 6:
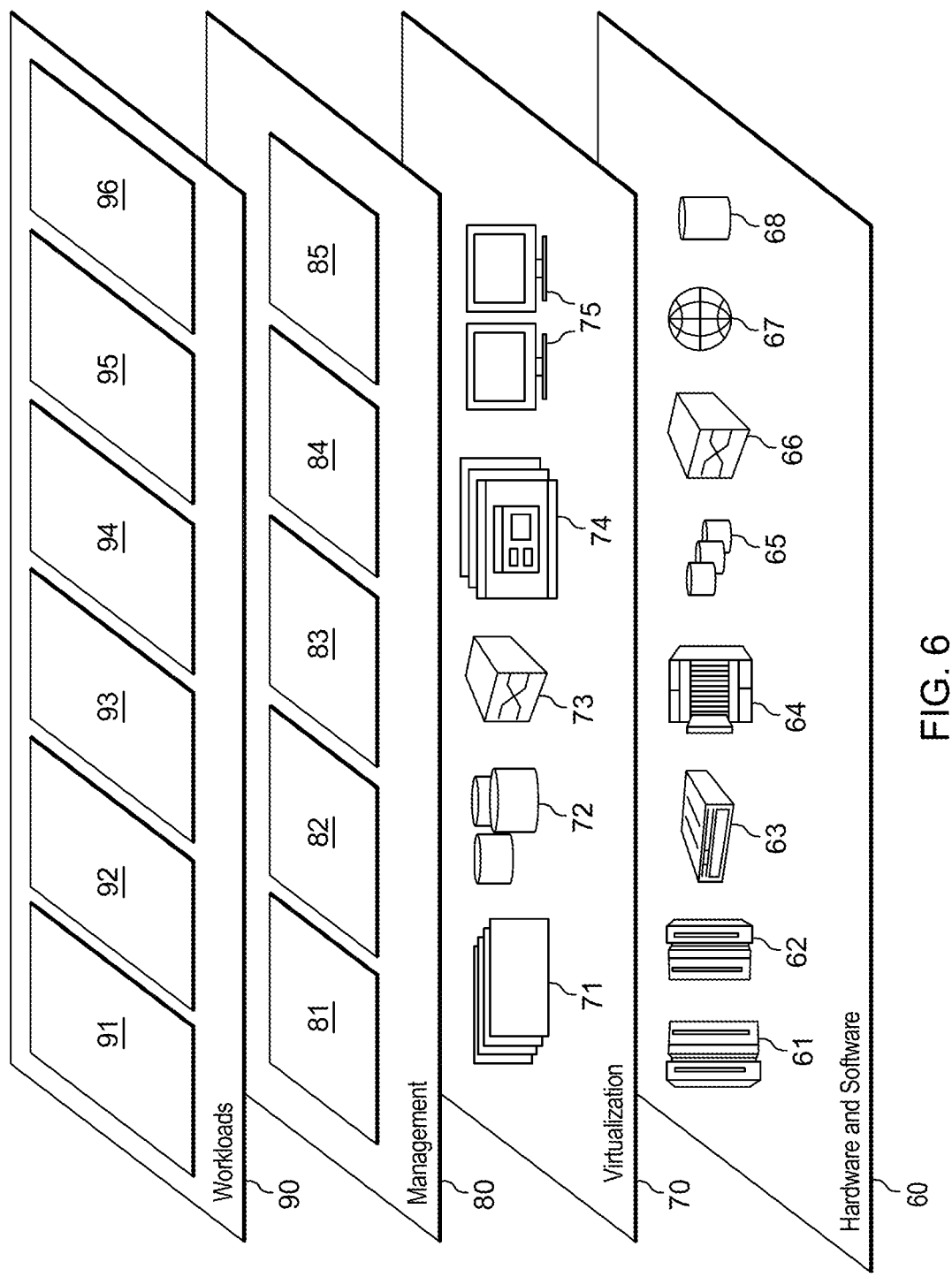
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of automated multi-round task-based conversation with a user, the computer-implemented method comprising:

in a first round conversation between a user and a data processing system involving at least one first task, cognitively identifying, by the data processing system, one or more first entity needed to perform the at least one first task and one or more first intent, based on a first input statement received by the data processing system from the user;

predicting, by the data processing system, at least one of the one or more first entity to be reused in a subsequent conversation based on the first round conversation and at least one conversation prior to the first round conversation, resulting in one or more reusable first entity;

in a second round conversation between the user and the data processing system involving at least one second task different from the at least one first task, the second round conversation being subsequent to the first round conversation, cognitively identifying, by the data processing system, one or more second entity needed to perform the at least one second task and one or more second intent, based on a second input statement received by the data processing system from the user; and reusing, by the data processing system, at least one of the one or more reusable first entity in the second round conversation resulting in at least one reused first entity, wherein the at least one reused first entity matches at least one of the one or more second entity.

2. The computer-implemented method of claim 1, wherein the one or more first entity and the one or more second entity are part of a plurality of predetermined categories.

3. The computer-implemented method of claim 1, further comprising training the data processing system using machine learning to improve the predicting.

4. The computer-implemented method of claim 3, wherein the training comprises using a model having as inputs pairs of intent and entity and an output of the at least one of the one or more first entity that is reused.

5. The computer-implemented method of claim 1, further comprising overwriting, by the data processing system, any of the one or more first entity other than the at least one reused first entity in the second round conversation.

6. The computer-implemented method of claim 5, further comprising requesting, by the data processing system, information from the user for performing the overwriting.

7. The computer-implemented method of claim 1, further comprising, prior to the first round conversation, training the data processing system to identify:

the one or more first entity and the one or more second entity; and the one or more first intent and the one or more second intent.

8. The computer-implemented method of claim 1, further comprising, between the first round conversation and the second round conversation:

receiving, by the data processing system, a user input statement unrelated to the at least one first task and the at least one second task;

responding to the user input statement unrelated to the at least one first task and the at least one second task; and storing the one or more first entity.

9. The computer-implemented method of claim 1, wherein Natural Language Understanding is used to interpret the first input statement and the second input statement.

10. A system for automated multi-round task-based conversation with a user, the system comprising:
a memory; and
at least one processor in communication with the memory, the memory storing program code executable by the at least one processor to perform a method, the method comprising:
in a first round conversation between a user and a data processing system involving at least one first task, cognitively identifying, by the data processing system, one or more first entity needed to perform the at least one first task and one or more first intent, based on a first input statement received by the data processing system from the user;
predicting, by the data processing system, at least one of the one or more first entity to be reused in a subsequent conversation based on the first round conversation and at least one conversation prior to the first round conversation, resulting in one or more reusable first entity;
in a second round conversation between the user and the data processing system involving at least one second task different from the at least one first task, the second round conversation being subsequent to the first round conversation, cognitively identifying, by the data processing system, one or more second entity needed to perform the at least one second task and one or more second intent, based on a second input statement received by the data processing system from the user; and
reusing, by the data processing system, at least one of the one or more reusable first entity in the second round conversation resulting in at least one reused first entity, wherein the at least one reused first entity matches at least one of the one or more second entity.

11. The system of claim 10, further comprising, prior to the first round conversation, training the data processing system to identify:
the one or more first entity and the one or more second entity; and
the one or more first intent and the one or more second intent.

12. The system of claim 10, further comprising, between the first round conversation and the second round conversation:
receiving, by the data processing system, a user input statement unrelated to the at least one first task and the at least one second task;
responding to the user input statement unrelated to the at least one first task and the at least one second task; and
storing the one or more first entity.

13. The system of claim 10, wherein Natural Language Understanding is used to interpret the first input statement and the second input statement.

14. A computer program product for automated multi-round task-based conversation with a user, the computer program product comprising:
a storage medium readable by a processor and storing instructions executable by the processor for performing a method of automated multi-round task-based conversation with a user, the method comprising:
in a first round conversation between a user and a data processing system involving at least one first task, cognitively identifying, by the data processing system, one or more first entity needed to perform the at least one first task and one or more first intent, based on a first input statement received by the data processing system from the user;
predicting, by the data processing system, at least one of the one or more first entity to be reused in a subsequent conversation based on the first round conversation and at least one conversation prior to the first round conversation, resulting in one or more reusable first entity
in a second round conversation between the user and the data processing system involving at least one second task different from the at least one first task, the second round conversation being subsequent to the first round conversation, cognitively identifying, by the data processing system, one or more second entity needed to perform the at least one second task and one or more second intent, based on a second input statement received by the data processing system from the user; and
reusing, by the data processing system, at least one of the one or more reusable first entity in the second round conversation, resulting in at least one reused first entity, wherein the at least one reused first entity matches at least one of the one or more second entity.

15. The computer program product of claim 14, further comprising, prior to the first round conversation, training the data processing system to identify:
the one or more first entity and the one or more second entity; and
the one or more first intent and the one or more second intent.

16. The computer program product of claim 14, further comprising, between the first round conversation and the second round conversation:
receiving, by the data processing system, a user input statement unrelated to the at least one first task and the at least one second task;
responding to the user input statement unrelated to the at least one first task and the at least one second task; and
storing the one or more first entity.

17. The computer program product of claim 14, wherein Natural Language Understanding is used to interpret the first input statement and the second input statement.

* * * * *